3,048,084
AUXILIARY MIRROR
Henry J. Iannuzzi, 53 Frederick Ave., Medford, Mass., assignor of ten percent to John Gallo, Sr., Boston, Mass.
Filed Nov. 7, 1960, Ser. No. 67,744
2 Claims. (Cl. 88—87)

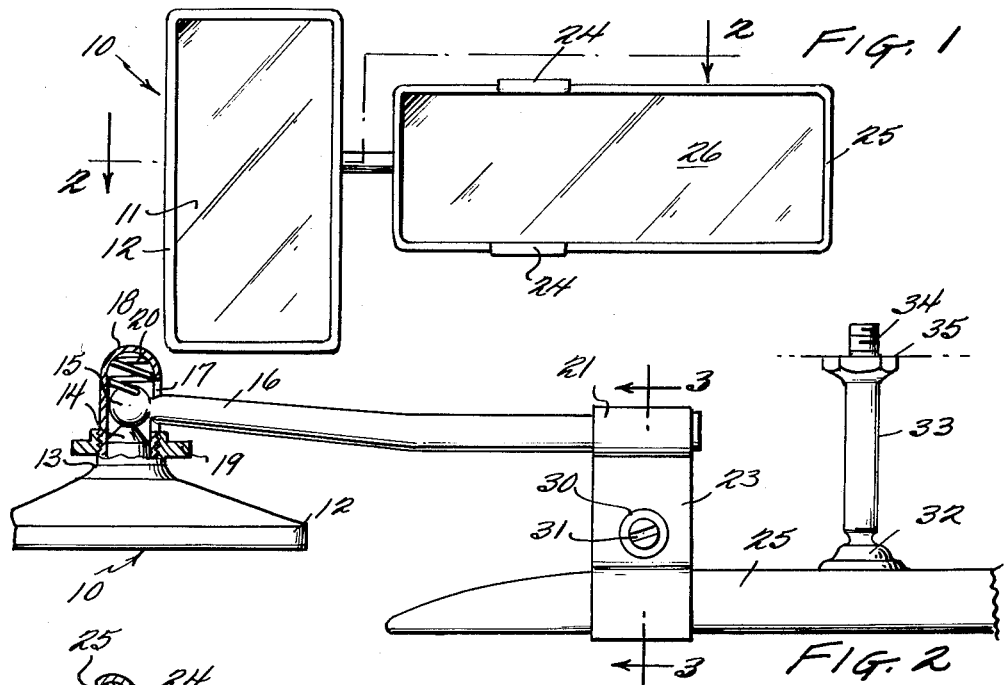
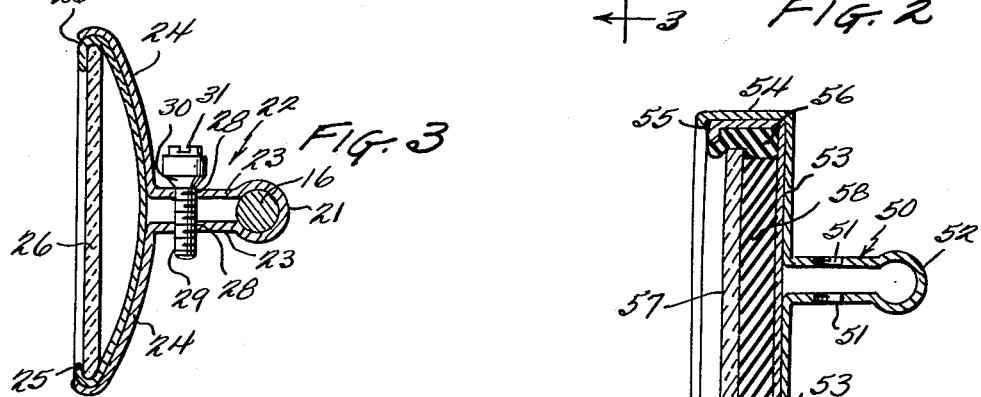
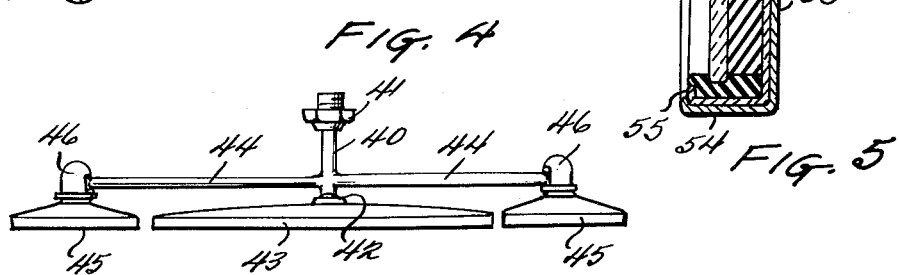

This invention relates to an auxiliary mirror, and has as its primary object the provision of an auxiliary mirror which may be attached to the conventional rear view mirror of a motor vehicle for enabling the driver or operator to see vehicles at the side of his car, normally out of range of the conventional rear view mirror.

An additional object of the invention is the provision of a device of this character which may be readily applied to or attached to any existing rear view mirror, and so adjusted as to most conveniently bring otherwise invisible sections of the car side into range of the operator's view.

A further object of the invention is the provision of a device of this character which is sturdy and durable in construction, reliable and efficient in operation, and relatively simple and inexpensive to manufacture, assemble, and utilize.

Still other objects reside in the combination of elements, arrangements of parts, and features of construction, all as will be more fully pointed out hereinafter, and disclosed in the accompanying drawings wherein there are shown preferred forms of this inventive concept.

In the drawings:

FIGURE 1 is a front elevational view of one form of auxiliary mirror embodying features of the instant invention attached to a standard rear view mirror.

FIGURE 2 is an enlarged sectional view taken substantially along the line 2—2 of FIG. 1 as viewed in the direction indicated by the arrows.

FIGURE 3 is an enlarged sectional view taken substantially along the line 3—3 of FIG. 2 as viewed in the direction indicated by the arrows.

FIGURE 4 is a top plan view of a slightly modified form of construction; and

FIGURE 5 is a sectional view similar to FIG. 3 showing a modified form of construction.

Similar reference characters refer to similar parts throughout the several views of the drawings.

Having reference now to the drawings in detail, the device of the instant invention is generally indicated at 10, and takes the form, in the illustrative embodiment of FIGS. 1 to 3, inclusive, of a rectangular mirror 11 mounted in a frame 12, the center of the frame having a protruding rearwardly extending threaded boss 13 containing a frusto conical stub rod 14 with a socket to receive a ball 15 on the end of a rod 16. The rod 16 extends through a slot 17 in the exterior of a closed end tube 18, which is secured, as by a clamping nut 19, on the boss 13, the frusto-conical member 14 and the ball serving as a universal joint for mounting the auxiliary mirror 11. A spring 20 serves to bias ball 15 into engagement with its seat on frusto-conical member 14.

Rod 16 extends into a loop 21, which forms a part of a clamping bracket, generally indicated at 22. This loop 21 is open on one side and parallel straps 23—23 are integrally formed at one end with the sides of this open section; at their other ends these parallel straps are integrally formed with arcuate diverging arms 24—24, which clampingly engage at the ends over their outer frame 25 of a conventional rear view mirror 26. The upper strap 23 is formed with a hole 28 and the lower strap with an aligned screw threaded hole into which there extends a bolt or screw 29 having a conical head portion 30 and a slotted screwdriver receiving head 31. The arrangement is such that, as the screw 29 is rotated, the straps 23—23 are drawn towards each other, causing the members 24 clampingly to engage over the frame 25 to hold the device in position.

Mirror frame 25 is mounted by means of a conventional ball and socket arrangement 32 on a rod 33 which is secured as by a bolt 34 and a nut 35, to the framework of the vehicle in any desired conventional manner.

It will thus be seen that the auxiliary mirror 11 may be set at any desired angle by virtue of its universal mounting relative to the setting of the conventional rear view mirror 26, which latter may in turn also be set at any desired angle so as to afford a materally increased field of view.

FIGURE 4 discloses a modified form of construction wherein a mounting stem 40, secured by a nut 41 to the frame of a vehicle, has mounted thereon by means of a universal joint 42 a rear view mirror 43. Oppositely extending arms 44—44 each carry an auxiliary mirror 45 mounted on opposite sides of mirror 43, by means of a universal joint 46, which corresponds in all particulars to that discussed in the modifications shown in FIGS. 1 and 2.

Still another modification is shown in FIG. 5 wherein a clamp 50, similar to clamp 22, is provided, having oppositely aligned threaded apertures 51 therein, and a sleeve 52 for the reception of a stem or rod 16. A bolt similar to the previously described bolt 29 is adapted to be threadedly engaged through the apertures for clampingly engaging diametrically opposite members 53 with right angularly extending portions 54 provided with outer flanges 55, over a rubber gasket 56 which extends peripherally entirely about the rear view mirror 57. A rubber backing or cushion 58 of any desired thickness is provided, in order to insure a resilient mounting for the entire assembly.

From the foregoing it will now be seen that there is herein provided an improved rear view mirror, which accomplishes all of the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative, and not in a limiting sense.

I claim:

1. An auxiliary rear view mirror for mounting on a conventional rear view mirror having a frusto-conical stub rod at the center and a hollow exteriorly threaded boss surrounding said stub rod, a closed end receptacle threaded on its exterior and having a lengthwise positioned slot in its side wall, a clamping nut securing the closed end receptacle onto the hollow threaded boss, a rod extending through the lengthwise positioned slot and having a ball on its end positioned against the frusto-conical stub rod, a coiled compression spring between said ball and the closed end of said receptacle, and a bracket for mounting said auxiliary rear view mirror on the conventional rear view mirror comprised by a loop surrounding the other end of the rod, parallel straps integrally formed with the ends of said loop, oppositely disposed arms on said straps for engaging the frame of the conventional mirror, and a clamping member engaging said parallel straps for holding the loop on the rod and the oppositely extending arms onto the frame of the conventional mirror.

2. A bracket for mounting onto the conventional rear view mirror on a motor vehicle comprised by a cylindrical loop having a lengthwise extending slot in one side, parallel straps integrally formed at their respective ends with the side walls of said lengthwise extending slot, oppositely disposed arms integrally formed at the respective other ends of said straps curved in the arc of a circle and having integral flanges at their outer ends curved on an arc of lesser radius for engaging the frame of the conventional mirror, a clamping member engaged with said straps for holding same in closely spaced parallel relationship, a rod received at one end in said cylindrical loop and having a ball on its other end, an auxiliary rear view mirror mounted by said bracket having a frusto-conical stub rod at its center and a hollow exteriorly threaded boss surrounding said stub rod, a closed end receptacle threaded on its exterior receiving the ball on said rod and having a lengthwise positioned slot in the side wall receiving the rod, a clamping nut securing the closed end receptacle onto the hollow boss, and a coiled compression spring within said receptacle abutting the closed end of the latter and forcing the ball against the frusto-conical stub rod.

References Cited in the file of this patent

UNITED STATES PATENTS

| | | |
|---|---|---|
| 1,932,697 | Jankovic | Oct. 31, 1933 |
| 2,214,639 | Lenta | Sept. 10, 1940 |
| 2,536,872 | Cookson | Jan. 2, 1951 |
| 2,696,964 | Ringwald | Dec. 14, 1954 |

FOREIGN PATENTS

| | | |
|---|---|---|
| 1,189,090 | France | Mar. 16, 1959 |